(12) United States Patent
Fregoe (10) Patent No.: US 12,156,623 B2
(45) Date of Patent: Dec. 3, 2024

(54) BUCKET RAMP ATTACHMENT

(71) Applicant: Danco, Inc., Irving, TX (US)

(72) Inventor: Casey J. Fregoe, The Colony, TX (US)

(73) Assignee: Danco, Inc., Irving, TX (US)

( * ) Notice: Subject to any disclaimer, the term of this patent is extended or adjusted under 35 U.S.C. 154(b) by 255 days.

(21) Appl. No.: 17/734,678

(22) Filed: May 2, 2022

(65) Prior Publication Data

US 2023/0346190 A1 Nov. 2, 2023

(51) Int. Cl.
*A47L 13/52* (2006.01)
*B65F 1/10* (2006.01)

(52) U.S. Cl.
CPC ............. *A47L 13/52* (2013.01); *B65F 1/10* (2013.01); *B65F 2210/136* (2013.01)

(58) Field of Classification Search
CPC ....... A47L 13/52; B65F 1/10; B65F 2210/136
USPC .............................................. 15/257.1–257.7
See application file for complete search history.

(56) References Cited

U.S. PATENT DOCUMENTS

| | | | |
|---|---|---|---|
| 2016/0037994 A1* | 2/2016 | Wollman | B65F 1/10 15/257.7 |
| 2018/0057258 A1* | 3/2018 | Dervin | A47L 13/52 |

* cited by examiner

*Primary Examiner* — Tom Rodgers
(74) *Attorney, Agent, or Firm* — Thomas | Horstemeyer, LLP (57) ABSTRACT

A cleaning attachment for a utility bucket is disclosed. The cleaning attachment can be used to sweep debris into the utility bucket. In one non-limiting example, among others, the cleaning attachment includes a ramp, a back platform, a rim engagement slot, and a retractable tab. The ramp includes a first end and a second end, and the second end having a greater height than the first end. The rim engagement slot engages a rim of a utility bucket. The rim engagement slot is formed between a front wall of the second end of the ramp and the back platform. The retractable tab extends from a back wall of the back platform. The retractable tab formed between two slots, and the retractable tab moves toward and away from the back wall for attaching and releasing the utility bucket.

20 Claims, 9 Drawing Sheets

BUCKET RAMP ATTACHMENT

BACKGROUND

Utility buckets are commonly found at job sites, in garages, in warehouse facilities, and in many other areas. These buckets are used for a variety of purposes, such as for storing or transporting items. Because of their widespread availability, buckets may even be used to store debris when a typical trash bag or trash can is not available.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The embodiments of the present disclosure relate to a cleaning attachment for a utility bucket. Utility buckets are commonly found at job sites, in garages, in warehouse facilities, and in many other areas. These buckets are used for a variety of purposes, such as for storing or transporting items. For example, a five gallon bucket may be used to store paint or other liquids. Because of their widespread availability, empty buckets can be placed on their side and used as a dustpan when a typical dustpan or trash can is not available. When used as a dustpan on its side, the bucket has limited usefulness because of the circular shape of the bucket. A bucket may be difficult to keep steady on its side while attempting to push or sweep debris into its opening. Debris may also be difficult to push or sweep into the bucket because it may be difficult to push debris over the rim of the bucket.

The cleaning attachment of the present disclosure includes structural components that enable a dustpan ramp to be easily attached to and released from a commonly available bucket. The various embodiments of the cleaning attachment can stabilize the bucket as debris is swept into the bucket. The embodiments also enable multiple cleaning attachments to nest within each other to occupy less space than a stacked arrangement of multiple cleaning attachments.

Figure 1A:
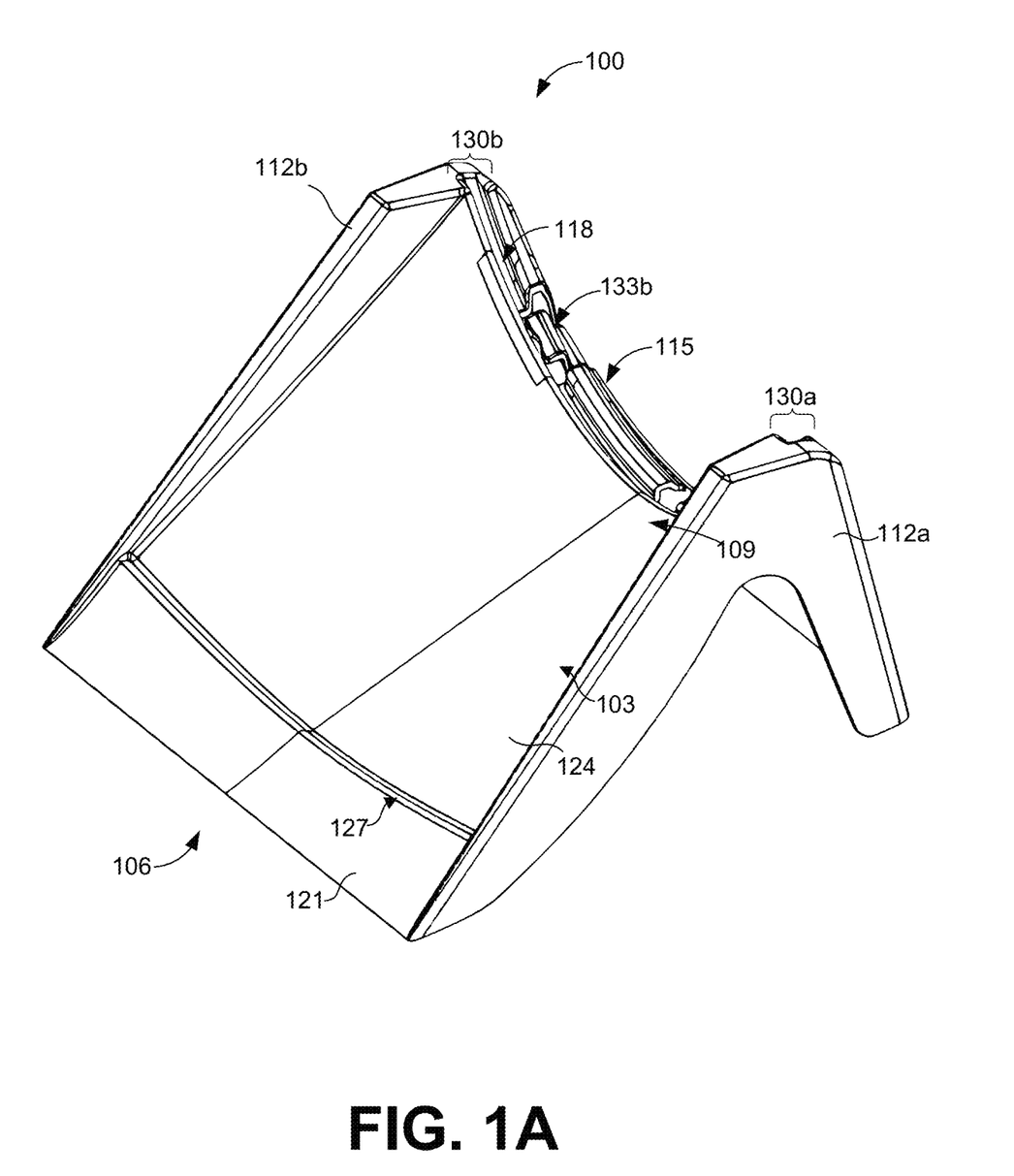
FIG. 1A is a front perspective view of a cleaning attachment, according to one embodiment described herein.

FIG. 1A provides a perspective view of a cleaning attachment 100 that can be attached to a utility bucket. The cleaning attachment 100 includes a ramp 103 with a first end 106 and a second end 109. The ramp 103 can be attached to a first side wall 112a and a second side wall 112b (collectively the "side walls 112"). The cleaning attachment 100 also includes a back platform 115 and a rim engagement slot 118. The rim engagement slot 118 can be formed between a portion of the second end 109 of the ramp 103 and the back platform 115.

The ramp 103 provides an inclined surface from a floor to an opening of the utility bucket. The ramp 103 includes a front portion 121 and a rear portion 124 that may be connected by a recessed area 127. As illustrated, the front portion 121 may be substantially flat and inclined. The rear portion 124 of the ramp 103 can have a curved surface. For example, FIG. 1A illustrates a non-limiting example of the rear portion 124 having a concave surface. As illustrated in FIG. 1A, the curvature of the rear portion 124 increases at areas that are closer to the second end 109. At the second end 109, the curvature of the ramp 103 can correspond to a perimeter of a rim of a utility bucket. In some embodiments, the entire ramp 103, the front portion 121 and the rear portion 124, may be substantially flat and inclined. Accordingly, the ramp 103 can support buckets with a variety of different perimeter shapes in addition to a circular shaped perimeter of typical buckets. For example, the ramp 103 can support buckets with a square-shape, a rectangular shape, or other suitable shaped perimeters.

The side walls 112 can be attached to the ramp 103 along its length. The side walls 112 can also form a portion of the first side end 130a and a second side end 130b (collectively the "side ends 130") of the rim engagement slot 118. The side ends 130 and the rim engagement slot 118 enable a utility bucket to rotate in the rim engagement slot 118 while the utility bucket is attached.

The back platform 115 can be used to support a portion of a utility bucket below its rim. The back platform 115 can be recessed and have a height that is less than a height of the second end 109 of the ramp 103. Since the back platform 115 can have a lower height than parts of the second end 109 of the ramp 103, a portion of the utility bucket can be placed on the back platform 115 to enable the opening of the utility bucket to substantially align with the second end 109 of the ramp 103 or to be situated lower than the second end 109 of the ramp 103. In some examples, when attached, the utility bucket is tilted because a first end of the utility bucket is placed on the ground.

The back platform 115 may also include a first retractable tab 133a (FIG. 1B) and a second retractable tab 133b (collectively the "retractable tabs 133"). The retractable tabs 133 can be used to restrain a rim of a utility bucket when the rim is positioned in the rim engagement slot 118. The retractable tabs 133 can move toward a back wall of the back platform 115 and toward a front wall of the ramp 103 for attaching and releasing the utility bucket.

The rim engagement slot 118 can be formed between a portion of the second end 109 of the ramp and the back platform 115. The rim engagement slot 118 can be used to position a rim of a utility bucket. While the rim of the utility bucket is positioned in the rim engagement slot 118, the utility bucket can be restrained or attached to the cleaning attachment 100 with one or more retractable tabs 133.

Additionally, a portion of an exterior surface of the utility bucket can be positioned on the back platform 115. The rim engagement slot 118 can have a curved shape between a first side end 130a and a second side end 130b. In other embodiments, the rim engagement slot 118 may have a substantially straight or horizontal shape in order to accommodate a bucket with sides, such as a square-shape, a rectangular-shaped bucket, or other suitable bucket shapes.

Figure 1B:
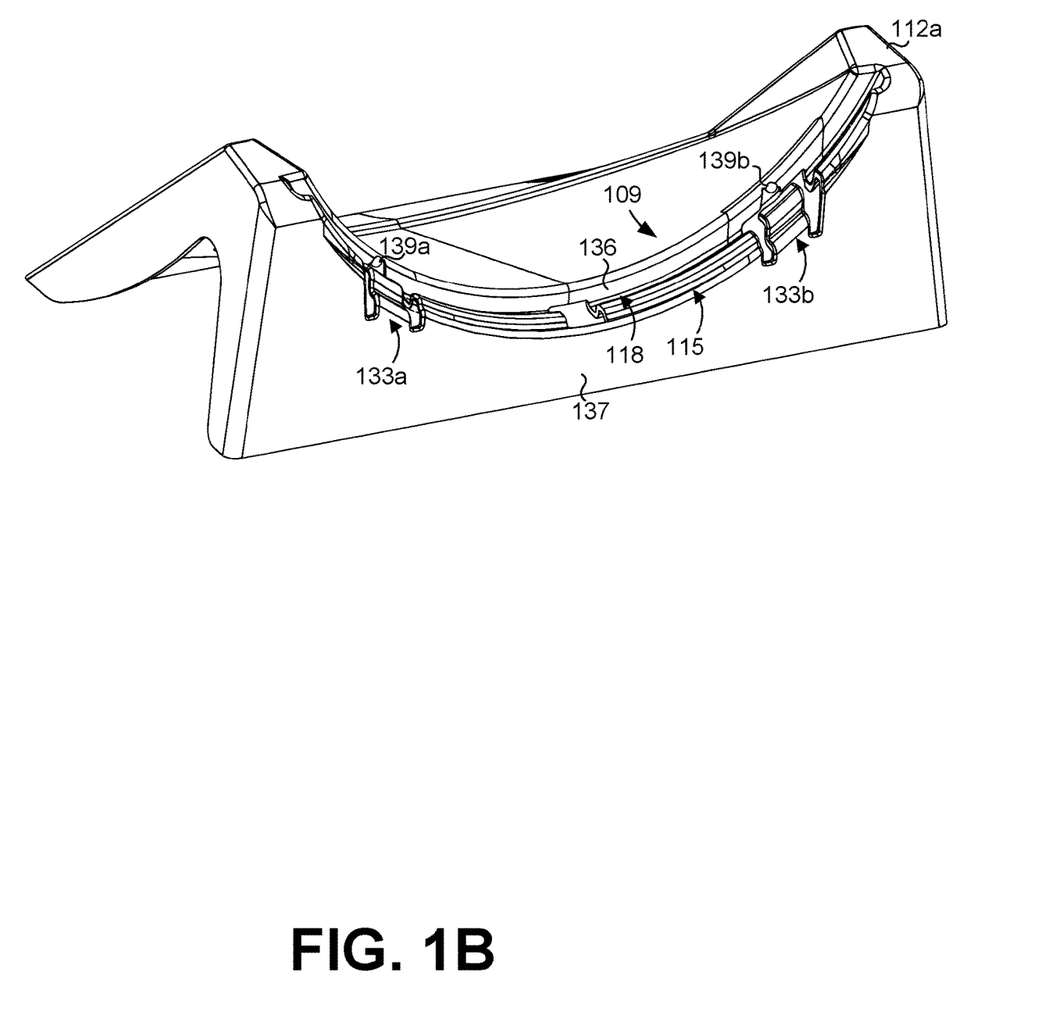
FIG. 1B is a rear perspective view of the cleaning attachment from FIG. 1A, according to one embodiment described herein.

Turning to FIG. 1B, shown is a perspective rear view of the cleaning attachment 100 from FIG. 1A. FIG. 1B illustrates an alternative view of the rim engagement slot 118. As illustrated in FIG. 1B, the rim engagement slot 118 is formed between a front wall 136 of the second end 109 and the back platform 115. The front wall 136 extends from the second end 109 of the ramp 103. Portions of the front wall 136 can be formed from the side walls 112. FIG. 1B illustrates that the front wall 136 curves to correspond to the second end 109 of the ramp 103.

In the depicted embodiment, the front wall 136 includes a first retention projection 139a and a second retention projection 139b (collectively "the retention projections 139"). The retention projections 139 can have a semi-spherical shape, a triangular shape, and other suitable shapes. The retention projections 139 can be positioned on the front wall 136 at an opposing location with respect to one of the retractable tabs 133. A retention projection 139 and a retractable tab 133 can be used in combination to attach a rim of the utility bucket. The back platform 115 and the retractable tabs 133 extend from the back wall 137.

Figure 1C:
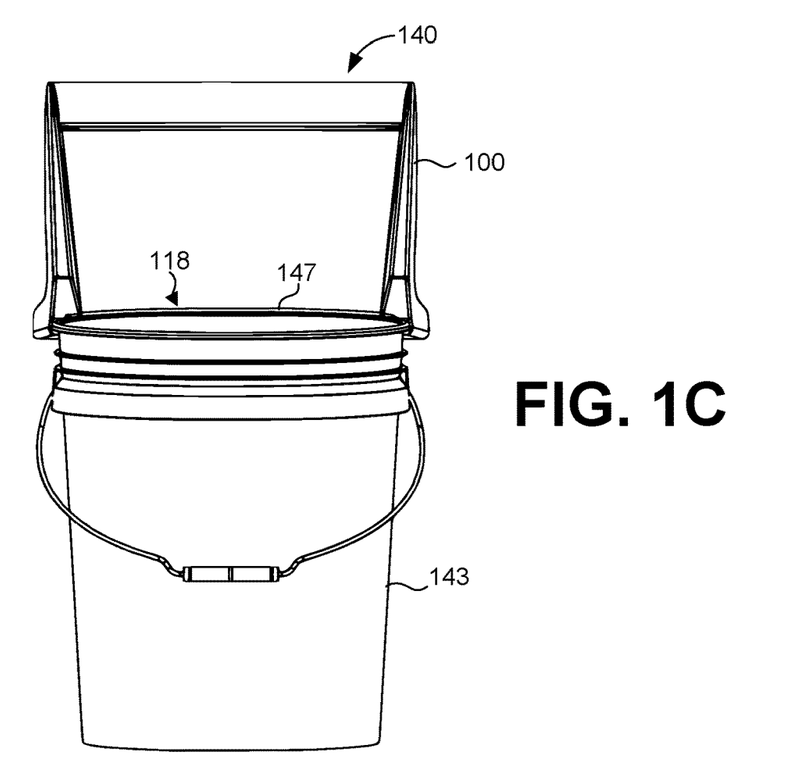
FIGS. 1C and 1D are various views of a cleaning attachment attached to a utility bucket, according to one embodiment described herein.
Figure 1D:
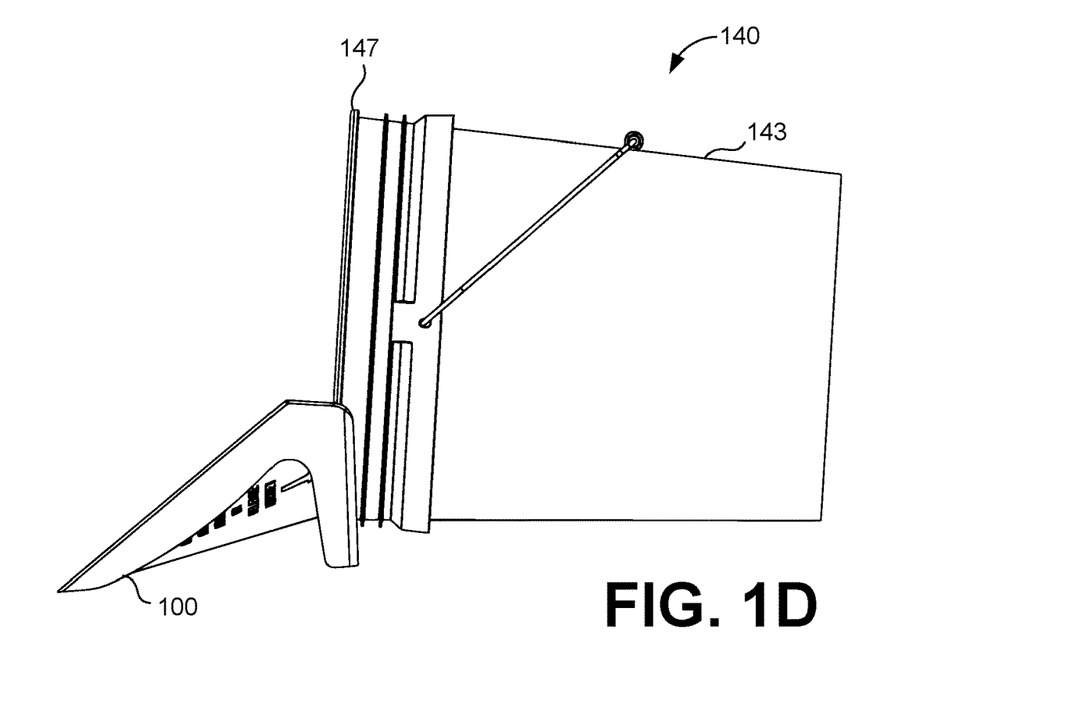

Turning now to FIG. 1C, shown is a top view of an assembly 140 of the cleaning attachment 100 coupled to a utility bucket 143. FIG. 1D is a side view of the assembly 140 of the cleaning attachment 100 attached to the utility bucket 143. As illustrated in FIG. 1C, a rim 147 of the utility bucket 143 is positioned within the rim engagement slot 118. The cleaning attachment 100 can be constructed from various materials, such as polypropylene, acrylonitrile butadiene styrene (ABS) or any other suitable materials. The various materials can be selected for structural integrity and rigidity.

Figure 2A:
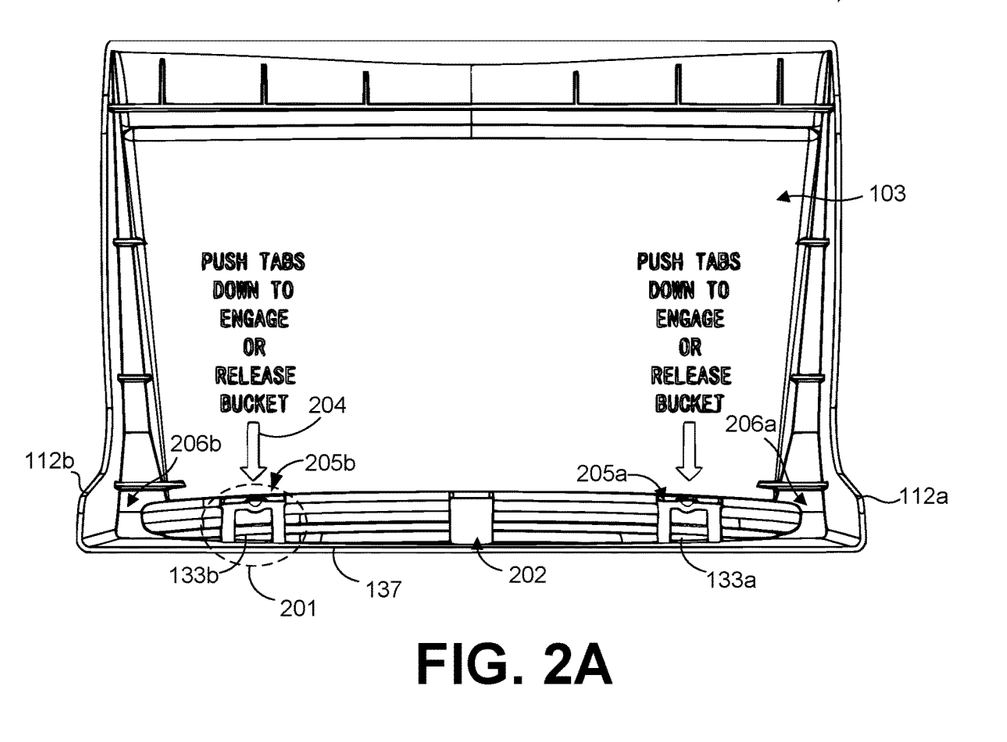
FIGS. 2A and 2B are bottom views of the cleaning attachment from FIGS. 1A and 1B, according to one embodiment described herein.
Figure 2B:
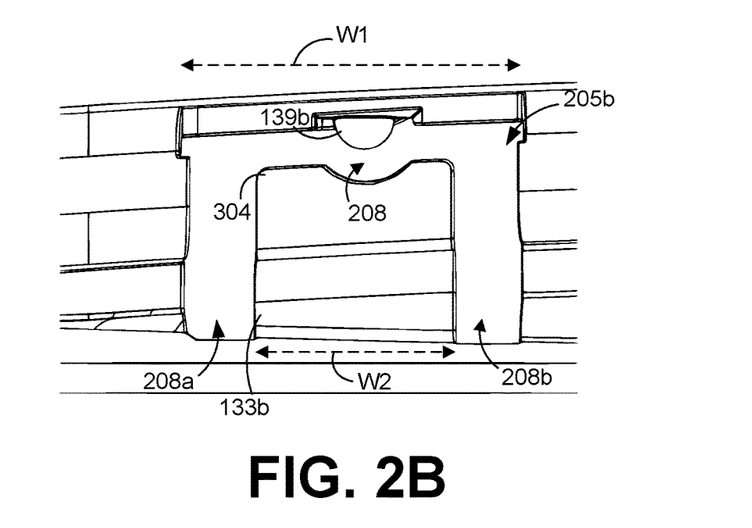

Moving on to FIG. 2A, shown is a bottom view of the cleaning attachment 100. FIG. 2B illustrates an enlarged view of the second rim aperture 205b for the reference area 201 in FIG. 2A. The cleaning attachment 100 includes a center aperture 202, a first rim aperture 205a, a second rim aperture 205b (collectively "the rim apertures 205"), a first side cavity 206a, and a second side cavity 206b (collectively "the side cavities 206"). Additionally, the ramp 103 includes one or more indicators 204 for providing a direction for moving the retractable tabs 133 in order to engage or release a utility bucket 143. For example, the retractable tabs 133 can be moved toward the back wall 137 and away from the ramp 103. In this non-limiting example, a user can place a first hand on the first side wall 112a and a second hand on the second side wall 112b. From the bottom view of the cleaning attachment 100 as shown in FIG. 2A, a first thumb of the first hand can be positioned on the underside of the first retractable tab 133a and a second thumb of the second hand can be positioned on the underside of the second retractable tab 133b. The first thumb and the second thumb can press the retractable tabs 133 toward the back wall 137. While the retractable tabs 133 are moved away from their initial position, a rim 147 of the utility bucket 143 can be inserted into the rim engagement slot 118. After the rim 147 has been inserted, the retractable tabs 133 can be released. Other fingers and methods can be used to attach the cleaning attachment 100 to the utility bucket 143 and release the cleaning attachment 100 from the utility bucket 143.

FIG. 2B illustrates an enlarged view of the second rim aperture 205b for the reference area 201 in FIG. 2A. As illustrated in FIG. 2B, the second rim aperture 205b includes a first adjacent slot 208a, a second adjacent slot 208b, and the second retractable tab 133b. The first adjacent slot 208a and the second adjacent slot 208b are situated adjacent to the second retractable tab 133b. As such, the second rim aperture 205b has a first width W1 that is larger than a second width W2 of the second retractable tab 133b. The first rim aperture 205a can include a third adjacent slot and a fourth adjacent slot, in which the first retractable tab 133a is between them.

Additionally, FIG. 2B illustrates a gap 208 between an end portion (the retention lip 304 in FIG. 3B) of the second retractable tab 133b and the second retention projection 139b. When the second retractable tab 133b is withdrawn toward the back wall 137, the gap 208 can increase in distance in order to allow the rim 147 of the utility bucket 143 to pass through. When the second retractable tab 133b is released it moves toward the front wall 136, and the gap 208 can reduce in distance for attaching or securing the rim 147 to the rim engagement slot 118. Thus, the gap 208 can be manipulated in order to attach and release the utility bucket 143 from the cleaning attachment 100.

Figure 3A:
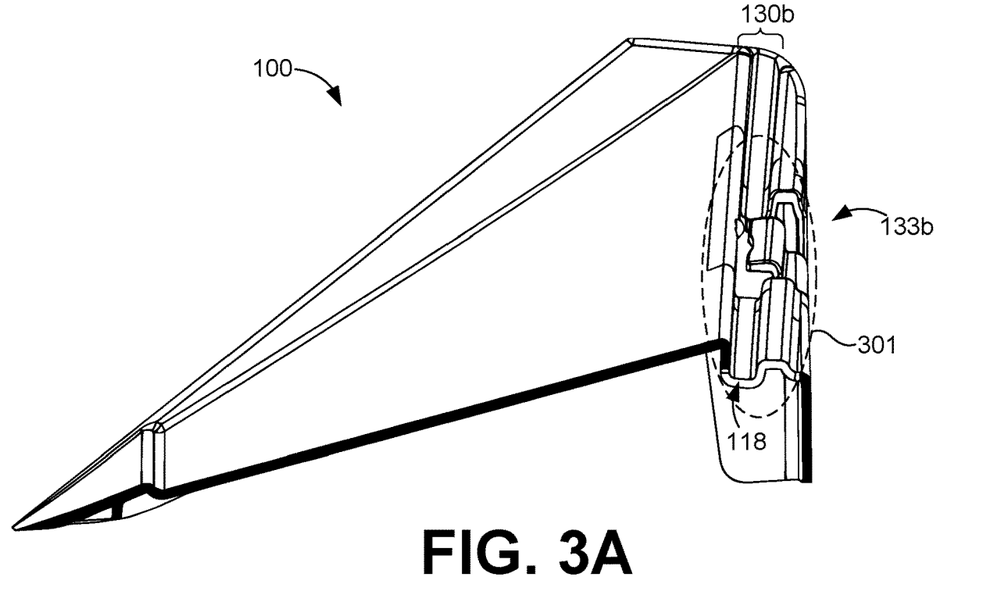
FIGS. 3A and 3B are side views of the cleaning attachment from FIGS. 1A and 1B, according to one embodiment described herein.
Figure 3B:
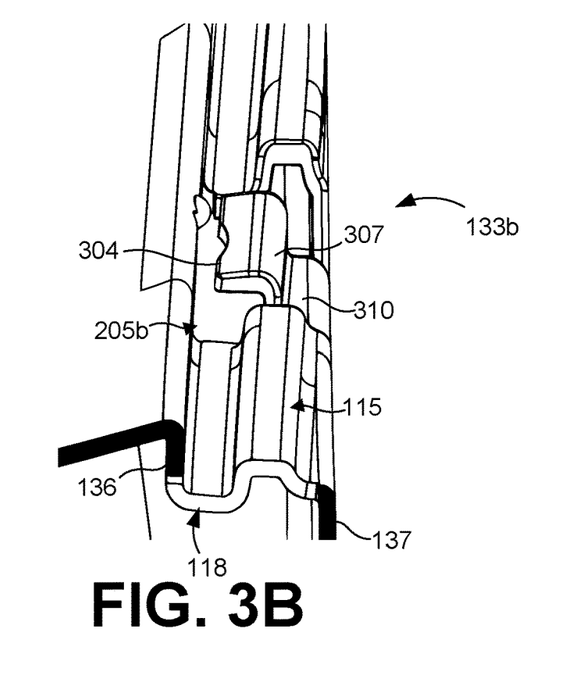

With reference to FIG. 3A, shown is a cross-sectional view of the cleaning attachment 100 from FIGS. 1A and 1B. FIG. 3B is an enlarged view of a reference area 301 in FIG. 3A. As shown in FIG. 3B, the second retractable tab 133b includes a retention lip 304, an intermediate tab wall 307, a tab shelf 310, and other components. The retention lip 304 may be an end portion of the retractable tab 133b. The retention lip 304 can be inserted behind a rim or lip of the utility bucket 143 and a side surface of the utility bucket 143. The retention lip 304 can extend from the intermediate tab wall 307. Additionally, in some embodiments, the retention lip 304 is a substantially horizontal component (e.g., perpendicular with respect to the back wall 137). In some embodiments, portions of the retention lip 304 can be parallel to portions of the tab shelf 310.

The intermediate tab wall 307 can be substantially vertical or parallel to the back wall 137. On a first end, the intermediate tab wall 307 extends from the retention lip 304. At a second end, the intermediate tab wall 307 extends from the tab shelf 310. In some embodiments, a user can contact and move the intermediate tab wall 307 in order to attach or release a utility bucket 143. The tab shelf 310 can be a substantially horizontal component that extends from the intermediate tab wall 307 at a first end and extends from the back wall 137 at a second end.

As shown in FIG. 3B, the rim engagement slot 118 can be formed between a front wall 136 and the back platform 115. The rim engagement slot 118 also includes the rim apertures 205. In some examples, a perimeter of the rim apertures 205 can include cut-away areas from the bottom surface of the rim engagement slot 118, portions of the back wall 137 (see e.g., FIG. 1B), and portions of the front wall 136 (see e.g., FIG. 1B).

Figure 4A:
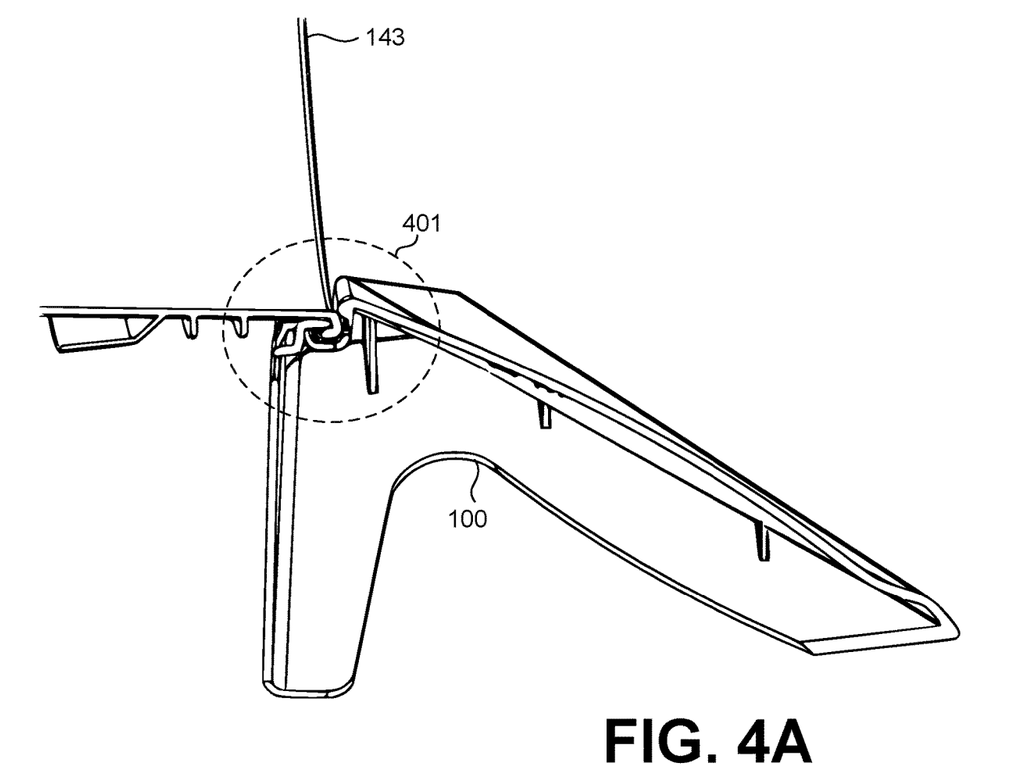
FIGS. 4A and 4B are cross sectional views of a cleaning attachment attached to the utility bucket, according to one embodiment described herein.
Figure 4B:
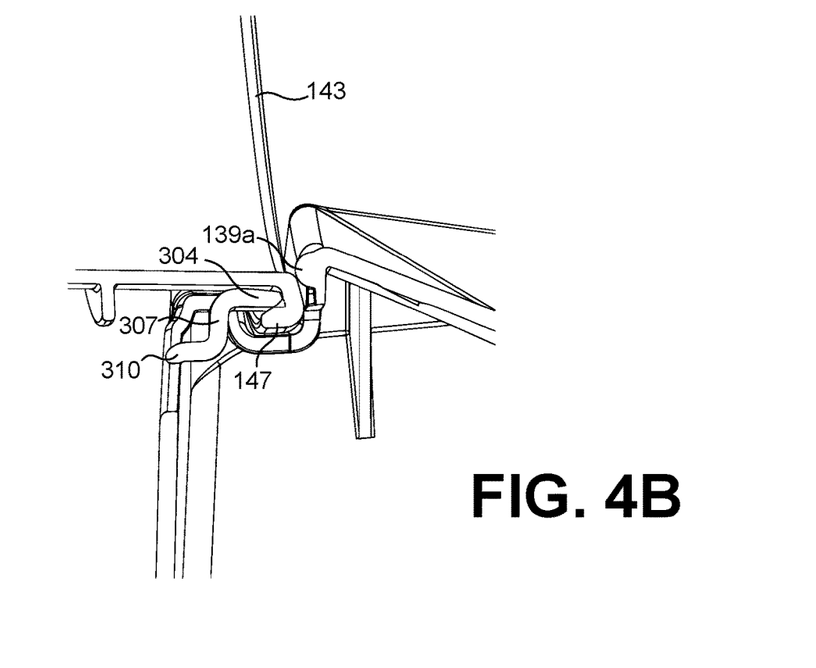

Moving on to FIG. 4A, shown is a cross-sectional view of the cleaning attachment 100 attached to a utility bucket 143, such as the assembly 140 shown in FIG. 1D. FIG. 4B illustrates an enlarged view of a reference area 401 in FIG. 4A. As shown in FIG. 4B, when attached, the utility bucket 143 is secured or restrained because of the retention lip 304 and the first retention projection 139a. In the illustrated non-limiting example, the rim 147 of the utility bucket 143 has a curled shaped (e.g., U shaped). The retention lip 304 is inserted between an end portion of the rim 147 and a side surface of the utility bucket 143. In this illustrated example, the retention lip 304 contacts the rim 147 on an underneath side and the first retention projection 139a contacts the exterior side of the rim 147. The retention lip 304 and the first retention projection 139a can cause a friction fit or snap connection with the utility bucket 143.

Figure 5:
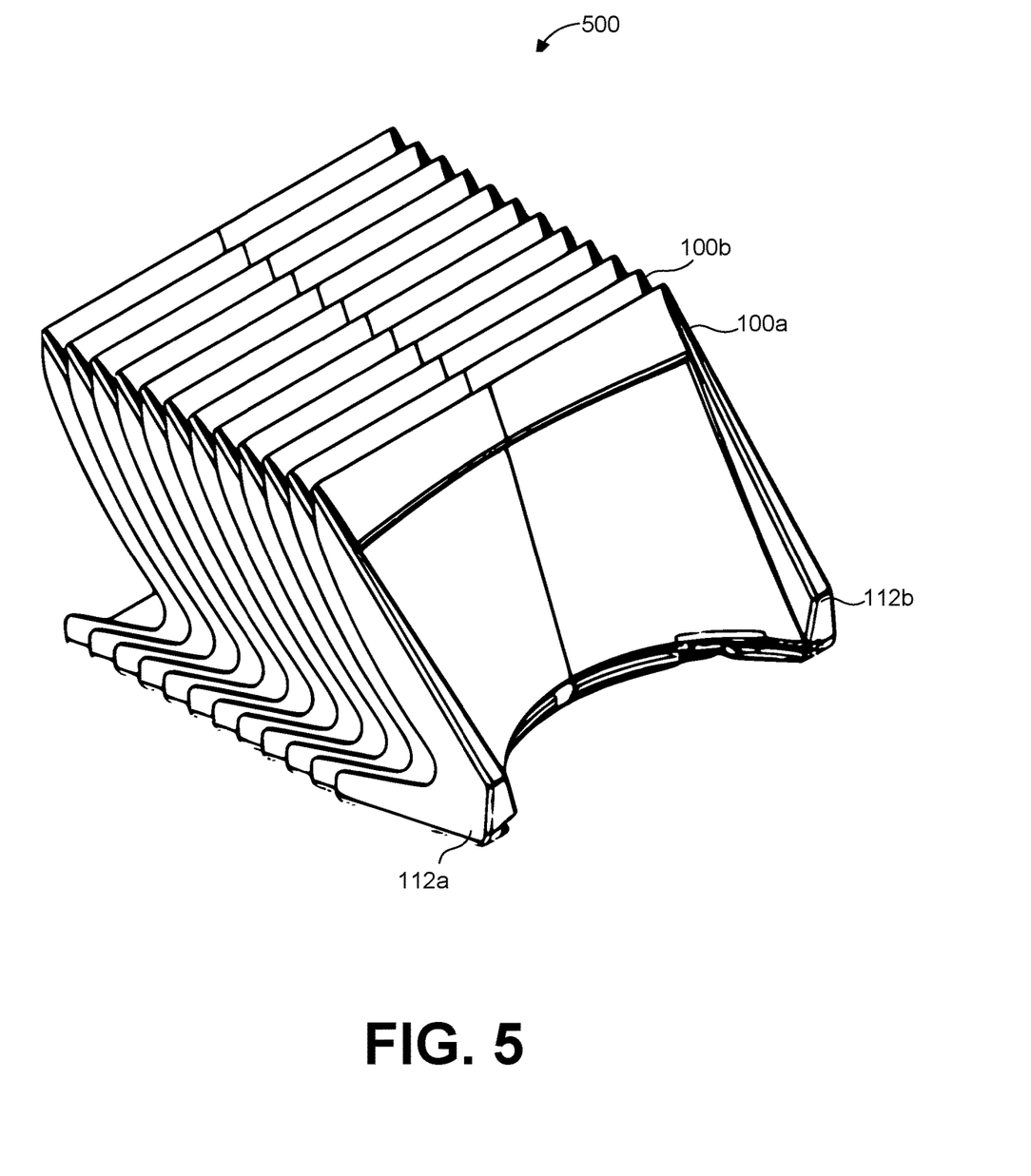
FIG. 5 is an illustration of nesting multiple cleaning attachments, according to one embodiment described herein.

With reference to FIG. 5, shown is a perspective view of multiple cleaning attachments in a nested arrangement 500. For example, FIG. 5 illustrates a first cleaning attachment 100a nested in front of a second cleaning attachment 100b and several other cleaning attachments 100 nested behind the second cleaning attachment 100b. The first side end 130a (FIG. 1A) of the second cleaning attachment 100b can be aligned with a first side cavity 206a (FIG. 2A) of the first cleaning attachment 100a. The second side end 130b (FIG. 1A) of the second cleaning attachment 100b can be aligned with a second side cavity 206b (FIG. 2A) of the first cleaning attachment 100a. Thus, the second cleaning attachment 100b can be inserted toward the bottom side (FIG. 2A) of the first cleaning attachment 100a. As illustrated in FIG. 5, the side walls 112 of the first cleaning attachment 100a encompass the side walls 112 of the second cleaning attachment 100b in the nested arrangement 500. Accordingly, the illustrated nested arrangement 500 occupies less space than the two cleaning attachments 100 separately stacked on top of each other. It should be noted that nesting can refer to a portion of a second cleaning attachment 100b positioned within a first cleaning attachment 100a. Additionally, the nesting feature helps lower the packaging cost (fit more in each box) and reduces shipping costs.

Figure 6A:
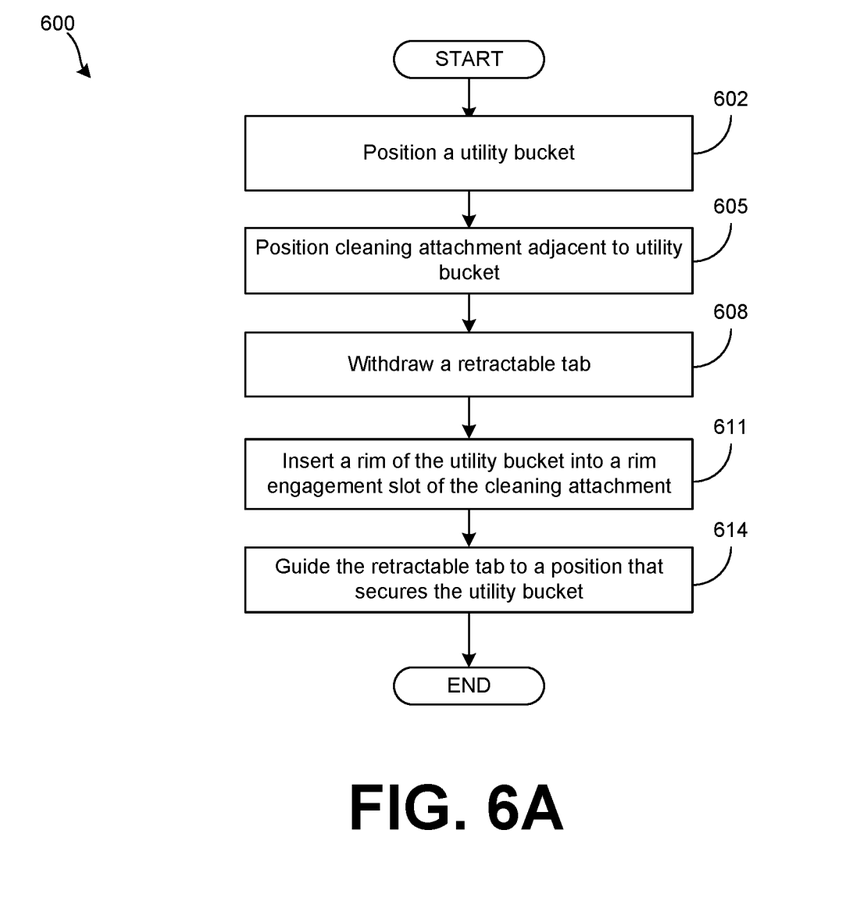
FIGS. 6A and 6B are flowcharts of example methods for attaching and releasing the cleaning attachment from a utility bucket, according to one embodiment described herein.

Referring next to FIG. 6A, shown is a flowchart that provides one example method 600 of attaching a cleaning attachment 100 to a utility bucket 143 according to various embodiments.

Beginning with box 602, the method 600 can involve positioning a utility bucket 143 in stable position. For example, the utility bucket 143 can be placed on a stable surface in a lateral position on a floor or other stable surface. In this non-limiting example, the user can stabilize the utility bucket 143 by positioning the utility bucket 143 between the feet of the user. Both feet can be used to apply pressure against the sides of the utility bucket 143 in order to secure it. Thus, the user's feet can be squeezed toward each other. In other installation examples, the utility bucket 143 can be placed and secured in a vertical position on the table or floor.

In box 605, the method 600 can involve positioning the rim engagement slot 118 of the cleaning attachment adjacent to a rim 147 of the utility bucket 143. Thus, the opening of the utility bucket 143 can be positioned near the second end 109 of the cleaning attachment 100. The opening of the utility bucket 143 is facing the second end 109 such that debris can be transferred from the second end 109 into the opening of the utility bucket 143.

In box 608, the method 600 can involve withdrawing the retractable tabs 133. In some examples, the user can place a right hand on the first side wall 112a and a left hand on the second side wall 112b. The cleaning attachment 100 is oriented such that the thumbs of the user's hands can access the bottom side (see e.g., FIG. 2A) of the cleaning attachment 100. Thus, a first thumb of the right hand can move or displace the first retractable tab 133a toward the back wall 137. The second thumb of the left hand can move or displace the second retractable tab 133b toward the back wall 137. By moving the retractable tabs 133 towards the back wall 137, the gap between the retention lips 304 and the retention projections 139 widens.

In box 611, the method 600 can involve inserting the rim 147 of the utility bucket 143 into the rim engagement slot 118. In some examples, the rim 147 of the utility bucket 143 may have to be inserted at an angle in order to navigate an end portion of the rim 147 around the retention lip 304.

In box 614, the method 600 can involve guiding the retractable tabs 133 to a position that secures the utility bucket 143. In some examples, the user can guide the retractable tabs 133 by just releasing the retractable tabs 133. As such, the retractable tabs 133 can move toward the front wall 136 wherein the retention lip 304 is positioned between an end portion of the rim 147 of the utility bucket 143 and the side surface of the utility bucket 143 (FIG. 4B). In this example, the rim 147 of the utility bucket 143 can be attached or secured to the cleaning attachment 100 based on a first contact with the retention lip 304 and a second contact with the retention projection 139.

In other examples, the user may intentionally guide the retractable tabs 133 to the retention lip 304 to a position between the end portion of the rim 147 and the side surface of the utility bucket 143. In these examples, as the user allows the retractable tab 133 to move toward the front wall 136, the user guides the retention lip 304 into position. Then, the method 600 proceeds to the end.

Figure 6B:
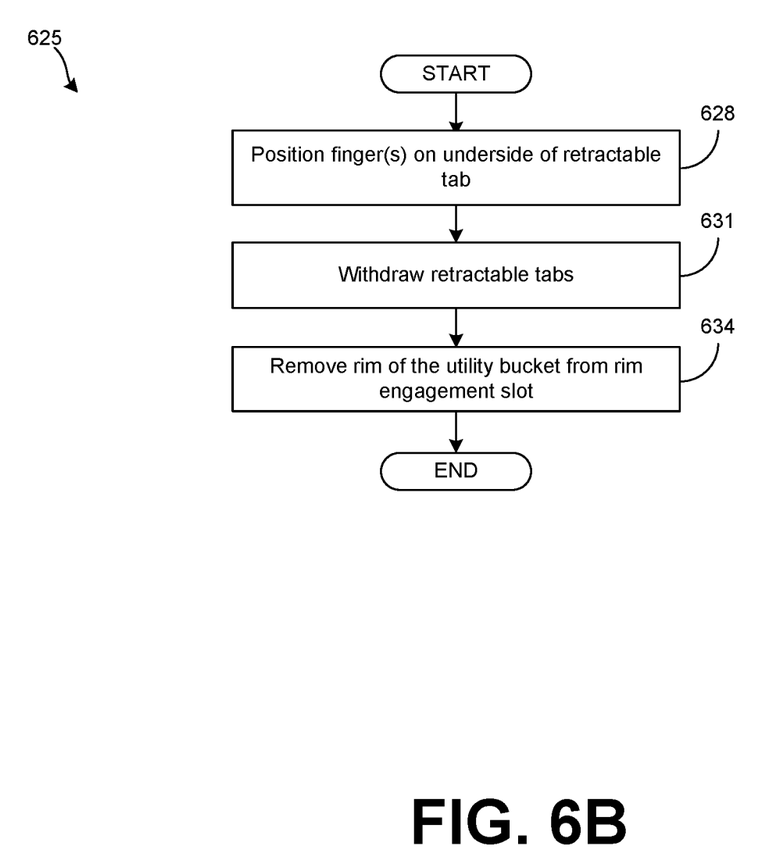

Referring next to FIG. 6B, shown is a flowchart that provides one example method 625 of releasing the cleaning attachment 100 from the utility bucket 143 according to various embodiments.

Beginning with box 628, the method 625 can involve positioning one or more fingers on the underside of the retractable tabs 133. The underside of the retractable tabs 133 can be accessed from the bottom side (FIG. 2A) of the cleaning attachment 100.

In box 631, the method 625 can involve withdrawing the retractable tabs 133. The retractable tabs can be withdrawn by moving the retractable tabs 133 toward the back wall 137. By moving the retractable tabs 133 toward the back wall 137, the retention lip 304 can disengage contact with the rim 147. The gap between the retention lip 304 and the retention projection 139 increases in distance.

In box 634, the method 625 can involve removing the rim 147 of the utility bucket 143 from the rim engagement slot 118. In some instances, the rim 147 may be oriented at an angle in order to navigate the end portion of the rim 147 around the retractable tabs 133. Then, the method 625 proceeds to the end.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. An attachment apparatus for a utility bucket, comprising:

a ramp with a first end and a second end, the second end having a greater height than the first end;
a back platform that has a smaller height than the second end of the ramp, the back platform being used to support a portion of a utility bucket below a rim of the utility bucket;
a rim engagement slot for engaging the rim of the utility bucket, the rim engagement slot being formed between a front wall of the second end of the ramp and the back platform; and
a retractable tab that extends from a back wall of the back platform, the retractable tab being formed between two adjacent slots, wherein the retractable tab moves toward the back wall and away from the back wall for attaching and releasing the utility bucket.

2. The attachment apparatus of claim 1, wherein the front wall comprises a retention projection, the retention projection is situated at an opposing location on the front wall with respect to a back wall location for the retractable tab.

3. The attachment apparatus of claim 2, wherein the retention projection comprises a semi-spherical surface.

4. The attachment apparatus of claim 1, wherein the retractable tab comprises:
a retention lip;
an intermediate tab wall that extends from the retention lip; and
a tab shelf that extends from the intermediate tab wall, the tab shelf extending from the back wall of the back platform.

5. The attachment apparatus of claim 1, wherein the two adjacent slots extend from an aperture in the rim engagement slot.

6. The attachment apparatus of claim 1, wherein the retractable tab comprises a retention lip that is situated above the rim engagement slot.

7. The attachment apparatus of claim 1, wherein the retractable tab comprises a first retractable tab that is closer to a first side of the rim engagement slot than a second side of the rim engagement slot, and further comprising:
a second retractable tab that is closer to the second side of the rim engagement slot than the first side of the rim engagement slot.

8. The attachment apparatus of claim 1, wherein the rim engagement slot has an annular shape that corresponds to a portion of a perimeter of the utility bucket.

9. The attachment apparatus of claim 1, wherein the retractable tab comprises a retention lip that has an arcuate surface.

10. The attachment apparatus of claim 1, wherein the rim engagement slot comprises an aperture that has a first width that is larger than a second width of the retractable tab.

11. A cleaning attachment for a bucket, comprising:
a ramp with a first end and a second end, the second end having a greater height than the first end;
a back platform that has a smaller height than the second end of the ramp, the back platform being used to support a portion of a utility bucket below a rim of the utility bucket;
a rim engagement slot for engaging the rim of the utility bucket, the rim engagement slot being formed between a front wall of the second end of the ramp and the back platform;
a first retractable tab that extends from a back wall of the back platform, the first retractable tab being located between a first adjacent slot and a second adjacent slot, wherein the first retractable tab moves toward the back wall and away from the back wall for attaching and releasing the utility bucket; and
a second retractable tab that extends from the back wall of the back platform, the second retractable tab being located between a third adjacent slot and a fourth adjacent slot, wherein the second retractable tab moves toward the back wall and away from the back wall for attaching and releasing the utility bucket.

12. The cleaning attachment of claim 11, wherein the cleaning attachment is comprised of polypropylene, or acrylonitrile butadiene styrene (ABS).

13. The cleaning attachment of claim 11, wherein the front wall comprises a retention projection, the retention projection is situated at an opposing location on the front wall with respect to a back wall location for the first retractable tab.

14. The cleaning attachment of claim 13, wherein the retention projection comprises a semi-spherical surface.

15. The cleaning attachment of claim 11, wherein at least one of the first retractable tab and the second retractable tab comprise:
a retention lip;
an intermediate tab wall that extends from the retention lip; and
a tab shelf that extends from the intermediate tab wall, the tab shelf extending from the back wall of the back platform.

16. The cleaning attachment of claim 11, wherein the rim engagement slot has an annular shape that corresponds to a portion of a perimeter of the utility bucket.

17. The cleaning attachment of claim 11, wherein the rim engagement slot comprises an aperture that has a first width that is larger than a second width of the second retractable tab.

18. A method for attaching a cleaning attachment to a bucket, comprising:
positioning a utility bucket laterally;
positioning a rim engagement slot of a cleaning attachment adjacent to an opening of the utility bucket, wherein the cleaning attachment comprises a ramp with a first end and a second end, the second end having a greater height than the first end;
withdrawing a retractable tab on the cleaning attachment toward a back wall of the cleaning attachment, wherein the retractable tab extends from the back wall and is located between two adjacent slots;
inserting a rim of the utility bucket into the rim engagement slot, the rim comprising a curled lip;
guiding the retractable tab to a position between the curled lip and a side surface of the utility bucket, the retractable tab being released as the retractable tab is guided to the position; and
positioning a portion of the utility bucket on a back platform of the cleaning attachment for support below the rim of the utility bucket.

19. The method of claim 18, wherein the retractable tab is withdrawn by applying a force to an underside of the retractable tab.

20. The method of claim 18, wherein the retractable tab is guided by allowing the retractable tab to move toward a front wall of the cleaning attachment.

* * * * *